US006287481B1

United States Patent
Luthra et al.

(10) Patent No.: US 6,287,481 B1
(45) Date of Patent: Sep. 11, 2001

(54) METHOD, APPARATUS, AND SYSTEM FOR TRIGGERING OXYGEN SCAVENGING FILMS

(75) Inventors: Narender Luthra, Simpsonville; Dilip K. Boal, Greenville; Drew V. Speer, Simpsonville, all of SC (US); Jeffrey A. Thomas, Cortlandt Manor, NY (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/230,594

(22) PCT Filed: Aug. 1, 1997

(86) PCT No.: PCT/US97/13598

§ 371 Date: Feb. 1, 2000

§ 102(e) Date: Feb. 1, 2000

(87) PCT Pub. No.: WO98/05555

PCT Pub. Date: Feb. 12, 1998

(51) Int. Cl.[7] .............................. C09K 15/02; C09K 15/04
(52) U.S. Cl. .................................. 252/188.28; 428/35.2; 428/35.8; 428/411.1; 426/234
(58) Field of Search ............................ 252/188.28, 383, 252/389.1, 389.53; 428/35.2, 35.8, 215, 219, 220, 35.9, 349, 516, 411.1; 426/133, 234, 238, 248

(56) References Cited

U.S. PATENT DOCUMENTS

| 4,871,559 | 10/1989 | Dunn et al. ........................ 426/248 |
| 5,021,515 | 6/1991 | Cochran et al. ................... 525/371 |
| 5,034,235 | 7/1991 | Dunn et al. ........................ 426/238 |
| 5,069,017 | 12/1991 | Fabricius ............................. 53/426 |
| 5,089,323 | 2/1992 | Nakae et al. ........................ 428/220 |
| 5,211,875 | 5/1993 | Speer et al. ...................... 252/188.28 |
| 5,310,497 | 5/1994 | Ve Speer et al. ............... 252/188.28 |
| 5,350,622 | 9/1994 | Speer et al. ......................... 428/215 |
| 5,378,428 | 1/1995 | Inoue et al. ............................. 422/9 |
| 5,399,289 | 3/1995 | Speer et al. ...................... 252/188.28 |
| 5,425,896 | 6/1995 | Speer et al. ...................... 252/188.28 |
| 5,498,364 | 3/1996 | Speer et al. ...................... 252/188.28 |
| 5,776,361 * | 7/1998 | Katsumoto et al. ............. 252/188.28 |
| 5,811,027 * | 9/1998 | Speer et al. ...................... 252/188.28 |
| 5,834,079 * | 11/1998 | Blinka et al. ...................... 428/35.7 |
| 5,911,910 * | 6/1999 | Becraft et al. .................. 252/188.28 |

FOREIGN PATENT DOCUMENTS

| 0 355 982 | 7/1989 | (EP) . |
| 0 451 762 | 4/1991 | (EP) . |
| Hei5-32277 | 2/1993 | (JP) . |
| Hei5-51048 | 3/1993 | (JP) . |
| Hei5-51049 | 3/1993 | (JP) . |
| Hei5-247276 | 9/1993 | (JP) . |

OTHER PUBLICATIONS

"Pulsed–Light Treatment of Food and Packaging", Joseph Dunn et al., Food Technology, Sep. 1995, pp. 95–98.

* cited by examiner

*Primary Examiner*—Joseph D. Anthony
(74) *Attorney, Agent, or Firm*—Mark B. Quatt

(57) ABSTRACT

A method for triggering an oxygen scavenging film includes the steps of providing an oxygen scavenging film comprising an oxidizable organic compound and, optionally, a transition metal catalyst; and exposing the film to a source of UV-C light at a wavelength, intensity and residence time sufficient to provide the film with a dose of UV-C light of at least 100 mJ/cm$^2$. An apparatus and packaging system are also disclosed.

11 Claims, 12 Drawing Sheets

METHOD, APPARATUS, AND SYSTEM FOR TRIGGERING OXYGEN SCAVENGING FILMS

The present application is a 35 USC §371 application of PCT/US97/13598 filed Aug. 1, 1997 which claims the benefit of USSN 08/691,829 filed Aug. 2, 1996, now abandoned.

BACKGROUND OF THE INVENTION

The invention relates generally to a method, apparatus, and system for packaging oxygen sensitive materials, and particularly to a method, apparatus, and system for triggering an oxygen scavenging film.

It is well known that limiting the exposure of oxygen sensitive articles to oxygen maintains and enhances the quality and shelf life of the article. For instance, by limiting the oxygen exposure of oxygen sensitive food articles in the packaging system, the quality of the food article is maintained and spoilage is reduced. In addition, such packaging also keeps the article in inventory longer thereby reducing restocking costs, and costs incurred from waste Commonly used packaging systems include modified atmosphere packaging (MAP) and vacuum packaging in conjunction with oxygen barrier films. In these instances, reduced oxygen environments are employed at the time of packaging, while the oxygen barrier film reduces the amount of oxygen that physically enters the package during storage.

U.S. Pat. No. 5,211,875 to Speer et al. discloses methods and compositions for scavenging oxygen. The "oxygen scavenger" materials disclosed by Speer et al. are compositions which consume, deplete or reduce the amount of oxygen from a given environment.

Oxygen scavenging materials are useful in MAP and barrier packaging environments. However, oxygen scavenging materials typically require triggering or activation to bring on the oxygen scavenging properties, and delays referred to as an induction period are sometimes experienced before the onset of useful oxygen scavenging properties. Compositions exhibiting lengthy induction times must be held by an end user in inventory for a sufficient period of time before use. On the other hand, oxygen scavenging compositions having a shorter induction period must be used within a relatively short period of time so that the oxygen scavenging properties of the material are not prematurely exhausted.

The need remains for an effective method of triggering an oxygen scavenger film so as to trigger oxygen scavenging properties when desired, preferably a method having a short induction period so that the film can be triggered at or immediately prior to use during packaging of an oxygen sensitive article, and preferably one which is simple and readily incorporated into existing packaging procedures.

The need also remains for an apparatus for triggering an oxygen scavenging film so as to provide the film with a short or negligible induction period, preferably enhanced oxygen scavenging rate and longevity, preferably an apparatus which is readily incorporated in-line into existing packaging systems for triggering oxygen scavenging film at or immediately prior to packaging.

SUMMARY OF THE INVENTION

In a first aspect of the invention, a method for triggering an oxygen scavenging film comprises providing an oxygen scavenging film comprising an oxidizable organic compound and exposing the film to a source of UV-C light at a wavelength, intensity and residence time sufficient to provide the film with a dose of UV-C light of at least 100 $mJ/cm^2$.

In a second aspect of the invention, an in-line method for packaging comprises providing an oxygen scavenging film comprising an oxidizable organic compound, exposing said film to a source of UV-C light having a wavelength of between 200 and 280 nm at an intensity and residence time sufficient to provide said film with a dose of UV-C light of at least 100 $mJ/cm^2$ so as to provide a triggered film, feeding said triggered film to a means for packaging an article; and applying said triggered film to said article so as to provide an oxygen scavenging package.

In a third aspect of the invention, an apparatus for triggering an oxygen scavenging film comprises means for emitting UV-C light having a wavelength of between 200 nm and 280 nm; means for defining a film path associated with the means for emitting UV-C light; and means for feeding a film having an oxidizable organic compound to the film path whereby the film is exposed to a dose of the UV-C light of at least 100 $mJ/cm^2$ so as to provide a triggered film.

In a fourth aspect of the invention, a packaging system comprises means for emitting UV-C light having a wavelength of between 200 nm and 280 nm; means for defining a film path associated with said means for emitting UV-C light; means for feeding a film having an oxidizable organic compound to said film path whereby said film is exposed to a dose of said UV-C light of at least 100 $mJ/cm^2$ so as to provide a triggered film; means for feeding said triggered film to a means for packaging articles and means for applying, said triggered film to the articles to make packages whereby said triggered film is continuously triggered and incorporated into said packages so as to provide oxygen scavenging packages

BRIEF DESCRIPTION OF THE DRAWINGS

A detailed description of preferred embodiments of the invention follows, with reference to the attached drawings, wherein.

DESCRIPTION OF THE PREFERRED EMBODIMENTS

Figure 1:
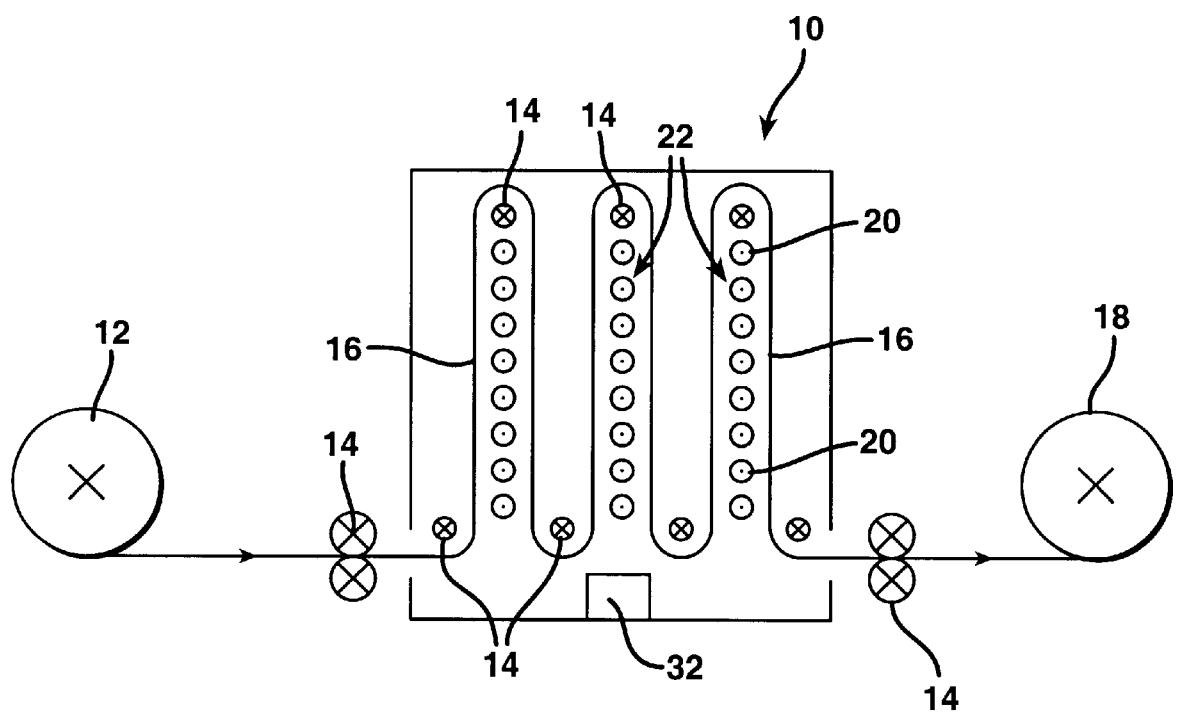
FIG. 1 schematically illustrates a stand alone apparatus and method for triggering an oxygen scavenging film.

The invention relates to an improved method, apparatus, and system for triggering an oxygen scavenging film, preferably for use in packaging articles. The invention can be used in the packaging of a wide variety of oxygen sensitive articles including fresh red meat such as beef, pork, lamb, and veal, smoked and processed meats such as sliced turkey, pepperoni, ham and bologna, vegetable articles such as tomato based products, other food products, including baby food, beverages such as beer, and products such as electronic components, pharmaceuticals and the like. The invention is readily adaptable to various vertical form-fill-and-seal (VFFS) and horizontal form-fill-and-seal (HFFS) packaging lines.

A method, apparatus, and system for triggering oxygen scavenging film are provided wherein an induction period of the film after triggering can be reduced to periods of substantially less than one day, whereby triggering can be incorporated as an in-line step, preferably by an end user of the oxygen scavenging film, so as to avoid inventory problems with respect to triggered films.

Oxygen scavenging compositions generally are described in U.S. Pat. Nos. 5,211,875, 5,350,622 and 5,399,289 to Speer et al., which are hereby incorporated by reference in their entirety. As used herein, oxygen scavenging film refers to film having a composition which consumes, depletes or reduces the amount of oxygen from a given environment to which the composition is exposed. The method and apparatus for triggering the oxygen scavenging film serves to trigger or activate the oxygen scavenging capability of the film.

Other oxygen scavengers which can be used in connection with this invention are disclosed in PCT patent publication WO 94/12590 (Commonwealth Scientific and Industrial Research Organisation), incorporated by reference herein in its entirety. These oxygen scavengers include at least one reducible organic compound which is reduced under predetermined conditions, the reduced form of the compound being oxidizable by molecular oxygen, wherein the reduction and/or subsequent oxidation of the organic compound occurs independent of the presence of a transition metal catalyst. The reducible organic compound is preferably a quinone, a photoreducible dye, or a carbonyl compound which has absorbence in the UV spectrum.

Films for use with the invention preferably include an oxidizable organic compound and a transition metal catalyst. Optionally, the oxygen scavenging film may also include photoinitiator compositions, antioxidants and other additives, for example as disclosed in U.S. Pat. No. 5,211,875. Preferred films contain oxidizable organic compound of substituted or unsubstituted ethylenically unsaturated hydrocarbon polymers, preferably having a molecular weight of at least 1000. More preferably, the oxidizable organic compound is selected from the group consisting of styrene/butadiene copolymers, styrene/isopretie copolymers, polybutadiene, polyisoprene, or mixtures thereof.

The transition metal catalyst of the oxygen scavenging composition is preferably a transition metal salt of cobalt, manganese, or mixtures thereof. Other suitable transition metal catalysts are disclosed in U.S. Pat. 5,211,875.

The ethylenically unsaturated hydrocarbon and transition metal catalyst may be further combined with one or more polymeric diluents, such as thermoplastic polymers which are typically used to form film layers in plastic packaging articles. In the manufacture of certain packaging articles well known thermosets can also be used as the polymeric diluent. Polymers which can be used as the diluent include, but are not limited to, polyethylene terephthalate (PET), polyethylene, low or very low density polyethylene, ultra-low density polyethylene, linear low density polyethylene, polypropylene, polyvinyl chloride, polystyrene, and ethylene copolymers such as ethylene-vinyl acetate, ethylene-alkyl (meth)acrylates, ethylene-(meth)acrylic acid and ethylene-(meth)acrylic acid ionomers. Blends of different diluents may also be used. The selection of the polymeric diluent depends in part on the article to be manufactured and the end use.

It has been discovered that exposing oxygen scavenging film to UV light at certain wavelength, intensity, residence time and distance from the film results in a triggering of the oxygen scavenging properties of the film in a relatively short period of time, i.e. the induction period. UV-C light such as UV light of germicidal wavelengths has been found particularly effective at triggering oxygen scavenging films. Preferred wavelengths are between 200 nm and 280 nm, such as 254 nm.

Oxygen scavenging films to be triggered are exposed to UV-C light at the desired wavelength, at an intensity and residence time sufficient to provide the film with a dose of UV-C light of at least 100 $mJ/cm^2$, preferably at least 200$mJ/cm^2$, more preferably between 350 and 1600 $mJ/cm^2$. It has been found that, within this range, different doses of UV-C light affect the scavenging rate of the film after triggering. When the triggered film is to be used in packages having a head space, such as modified atmosphere packages (MAP), a faster oxygen scavenging rate, preferably with a very short induction period, is preferred. With such packages, the preferred doses of UV-C light are between 350 and 1600 $mJ/cm^2$, such as between 500 and 800 $mJ/cm^2$.

When the oxygen scavenging film is to be used in oxygen barrier packaging, the scavenging film provides a function of assisting in preventing the influx of oxygen through the package layers. In this application, lower oxygen scavenging rates are acceptable and preferred so that the oxygen scavenging film enhances the oxygen barrier nature of the package for longer periods of time. For use with barrier packages, especially high barrier long hold packages, the preferred dose of triggering UV-C light is between 100 and 600 $mJ/cm^2$.

The intensity and residence time of UV-C light may be utilized to provide the desired dose for a particular film. It is preferred to expose film to be triggered to UV-C light with a wavelength between about 240 and 265 nm at an intensity of at least 0.8 $mW/cm^2$, more preferably at least 2.0 $mW/cm^2$. In order to provide film paths which are not very long, film to be triggered is exposed more preferably to UV-C light at an intensity of between 3.0 and 10 $mW/cm^2$, such as between 3.0 and 7.5 $mW/cm^2$. This intensity is provided at a distance from the source of UV-C light to the film of preferably between 1 cm and 3 cm.

The desired dose of UV-C light is provided to a particular film by traversing the film over a path having a particular length over which the film is exposed to the UV-C light. At intensities as set forth above, oxygen scavenging film is usefully triggered over film paths preferably having a length between 1 m and 12 m, preferably 2 to 4 m and at average traveling speed of the film along the path of between 1 m/min and 30 m/min, typically 1.2 to 4 m/min. This procedure results in exposure times of the film to UV-C light of typically between 15 and 90 seconds. The above described wavelength, intensity and residence time of UV-C light have been found to trigger oxygen scavenging film to excellent oxygen scavenging rates, and with very small or negligible induction periods, thereby allowing the method of the present invention to be incorporated in-line to existing packaging methods so that oxygen scavenging film can be triggered at or shortly prior to packaging, and ameliorating problems related to storage and inventory of triggered oxygen scavenging films.

Oxygen scavenging films thus triggered exhibit oxygen scavenging rates, depending upon the formulation and type of package to which the film is applied, of between 1 $cc/m^2/day$ and 100 $cc/m^2/day$ at temperatures of 4° C. when measured 4 days after triggering. For modified atmosphere packages (MAP) having a modified atmosphere headspace, (MAP, 1–2% $O_2$), triggered oxygen scavenging film exhibits an oxygen scavenging rate of between 20 and 66 $cc/m^2/day$ at 4° C. when measured 4 days after triggering, thereby removing oxygen from the head space of such a package so as to reduce or eliminate adverse affects upon the article packaged therein.

Oxygen scavenging films, triggered as set forth above for use in high barrier long hold packages, exhibit oxygen scavenging rates of preferably between 1 and 10 $cc/m^2/day$ when measured at room temperature, and 30 days after triggering, thereby providing a further oxygen barrier in the oxygen barrier layers of the package to which the oxygen scavenging film is applied, which oxygen scavenging exists over a longer period of time.

Triggered oxygen scavenging films can be used to rapidly reduce the residual oxygen content of a refrigerated MAP package to less than or equal to 0.5%, preferably less than or equal to 0.1% within less than or equal to 7 days, preferably less than or equal to 4 days and ideally as quickly as possible after article packaging. This allows packages that include the triggered oxygen scavenging film to be packaged with an initial residual oxygen content of 1 to 2% or higher. The oxygen scavenging film rapidly reduces the residual oxygen content to acceptable levels, and packaging at a higher initial residual oxygen content allows for faster machine cycles, thereby enhancing article output.

Referring now to the drawings, the method and apparatus for triggering oxygen scavenging film according to the invention will be further described. FIG. 1 illustrates a free standing triggering unit 10 having an unwind roll 12 for feeding film to unit 10, a series of rollers 14 defining a film path 16 through triggering unit 10, and a windup roll 18 for receiving triggered film for subsequent use. Triggering unit 10 includes a series of low pressure germicidal wavelength UV bulbs 20 arranged in banks 22, with film path 16 being arranged to pass a film relative to banks 22 so as to expose the film to the desired dose of UV-C light.

The oxygen scavenging film may include a number of layers, with the oxidizable organic compound and transition metal catalyst layer preferably being arranged toward one side thereof. Multilayer oxygen scavenging films are described in U.S. Pat. No. 5,350,622.

It is preferable to expose only the oxidizable organic compound and the transition metal catalyst side of the multilayer film to UV-C light. Further, it is preferred that any layers of the multilayer film that are between the source of UV-C light and the oxygen scavenging film be effectively transparent between 240 and 265 nm. Thus, as illustrated in FIG. 1, film path 16 can be arranged so as to expose only one side of film to banks 22 of bulbs 20, although optionally both sides of the film can be exposed to bulbs 20.

It is preferred to provide film path 16 at a distance from banks 22 of bulbs 20 of between 1 cm and 3 cm, such as 2 cm. At distances greater than 3 cm, the intensity of UV-C light loses affect at triggering films. At distances of less than 1 cm, the film can he adversely affected by bulb heat and static electricity.

Figure 2:
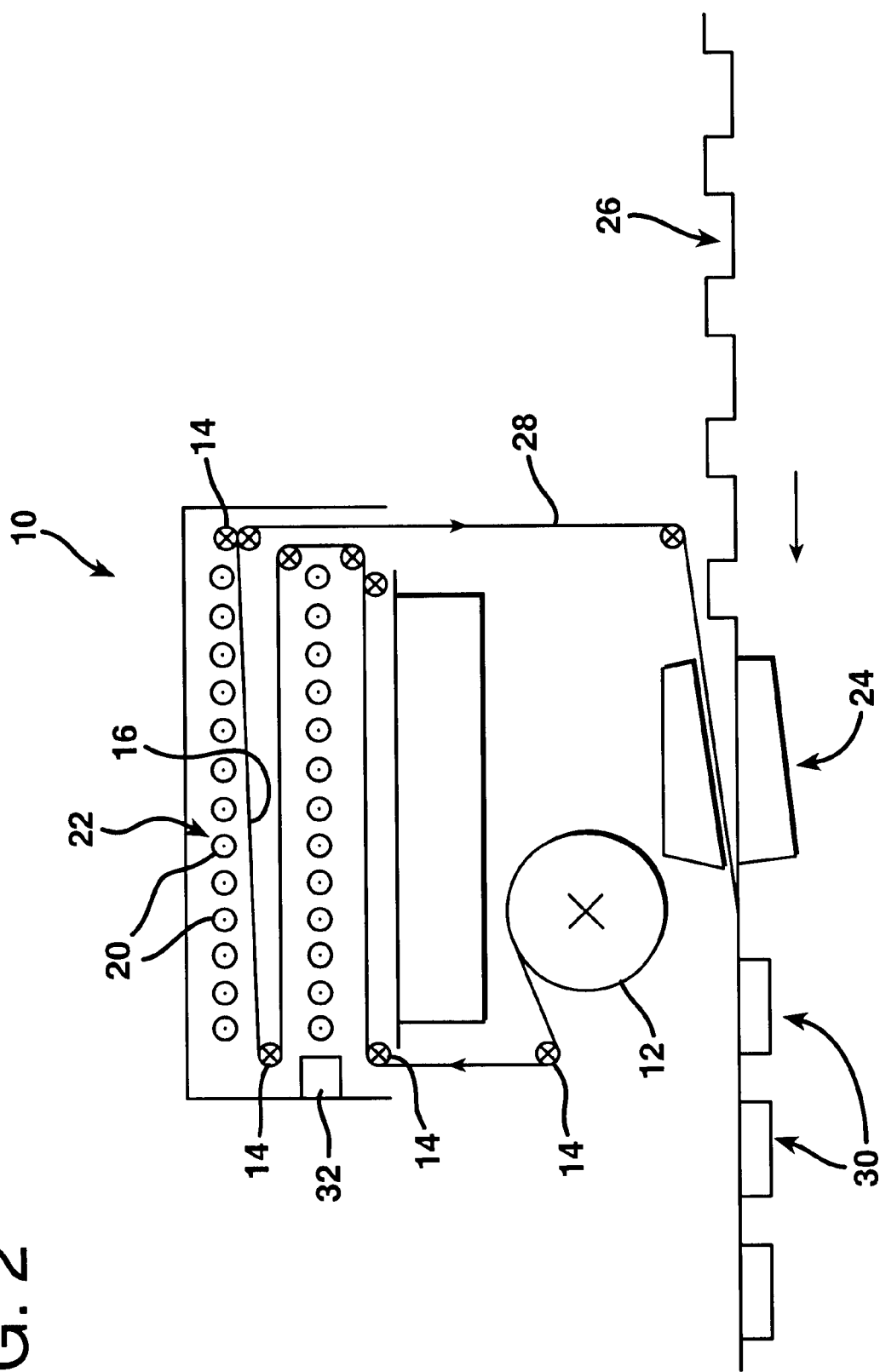
FIG. 2 schematically illustrates an apparatus and method incorporated in-line into a packaging system.

FIG. 2 illustrates an embodiment of triggering unit 10 wherein triggering unit 10 is incorporated in-line into a packaging apparatus. Triggering unit 10 is positioned so as to receive film from unwind roll 12, pass film along film path 16 for exposure to UV-C light, and feed triggered film directly to a packaging unit, for example, sealing/gas flush dies 24. Triggered film is immediately incorporated as a layer into packages along with formed web 26 supplied from other elements of the packaging assembly. Sealing/gas flush dies 24 serve to apply triggered film 28 to formed web 26 so as to provide packages 30 including triggered film.

Optionally, triggering unit 10 can be provided with a sensor unit 32 for monitoring the dose of UV-C light emitted by bulbs 20. This allows detection of deteriorating or malfunctioning bulbs 20 so that the use of un-triggered film in packaging can be substantially avoided. Sensor unit 32 can be, for example, an Online UV Intensity Display Module (EIT, Inc., Sterling, Va. having 250–260 nm Standard UVI Sensors. Of course, numerous other apparatus are available for use in measuring the level of UV-C light output of banks 22. Sensor unit 32 can be interlocked or operatively associated with a controller for the packaging line so that packaging can be automatically interrupted if UV-C light output is insufficient.

Bulbs 20 are preferably shielded so as to insure that the UV exposure to workers during an 8 hour shift is within a permissible level. This corresponds to an effective intensity or irradiance E (as defined in Radiation Curing, May 1985, pages 10 to 13) of less than or equal to 0.1 $\mu W/cm^2$ in the range of 200 to 315 nm.

Bulbs 20 are preferably provided with a sleeve member for protecting the film in the film path 16 against contact with broken elements such as glass, etc., of a bulb 20, should bulb 20 break or otherwise fail. This avoids contamination of the film due to such a failure. The sleeve can be a shrinkable member or coating to be applied to bulbs 20, preferably having a minimal affect upon intensity of UV-C light emitted from bulbs 20. The preferred sleeve is a heat-shrunk FEP-Teflon® sleeve, which does not adversely affect the intensity of germicidal 254 nm bulbs used to provide UV-C light.

Bulbs 20 can be fluorescent tube-type bulbs, which preferably have a width sufficient to extend beyond either side of the width of a film to be treated, thereby insuring a complete dose of UV-C light to be applied to oxygen scavenging film to be triggered. Bulbs have a width of preferably between 20 and 48 inches, which may be suitable for treating films having a width of between 13 and 40 inches. Suitable bulbs are sold by Voltarc under part designation UV-LUX GRFX5194.

The step of exposing oxygen scavenging film to UV-C light can optionally be carried out in a stepwise procedure wherein the film is exposed in a plurality of discrete periods of time. For example, if the intended exposure time or residence time is to be 40 seconds, the exposing step can be carried out in a series of four exposing steps, each 10 seconds long, preferably with a two second interval therebetween. Such stepwise exposure provides enhanced oxygen scavenging characteristics of the film triggered thereby. This embodiment is readily adaptable to packaging machines which operate with intermittent motion such as MULTIVAC R7000 distributed by KOCH of Kansas City, Mo.

The following examples are provided in order to further illustrate the advantageous features of the present invention.

EXAMPLE 1

A three-layer oxygen scavenging film was prepared by a flat coextrusion process. The outer layers of the film consisted of LLDPE (Dowlex® 3010, Dow Chemical,), and the inner oxygen scavenging layer (OSL) consisted of 68% 1,2-polybutadiene ( B830, JSR (Japan Synthetic Rubber)), 12% EPDM rubber (Vistalon® 3708, Exxon), and 20% of an EVA-9 (ethylene/vinyl acetate copolymer, Exxon) based cobalt neodecanoate and benzophenone masterbatch, which had been prepared previously in a twin screw extruder. The final concentration of cobalt in the scavenging layer of the film was 540 ppm as cobalt metal, and the final concentration of benzophienone was 0 5%. The total thickness of the film was 3 mils, with each layer being 1 mil thick. Portions of film (200 $cm^2$) were irradiated as described below in Table 1 with a UVP Inc. model XX-15S germicidal lamp. The output of the lamp was measured at a distance of 2 cm with an International Light model 1400A radiometer equipped with a SEL 240 detector, a 254 nm narrow band pass filter (NS254), W diffuser, and a neutral density filter (QNDS2). After a 5 minute warm up period, the output ranged from 4.2–5.7 $mW/cm^2$ at 254 nm. Irradiated films were then sealed in barrier bags (BDF 2001, Cryovac® Division of W. R Grace & Co.), and inflated with 300 cc of air. Portions of the headspace were periodically withdrawn and analyzed for oxygen with a Mocon LC 700F oxygen analyzer. The resulting scavenging data is summarized below in Table 1. The average rate is calculated by considering only the end points, with the following formula:

Average Rate=cc $O_2$ scavenged/($m^2$·day)

and in this example was calculated after 30 days. The peak instantaneous rate is the highest scavenging rate observed during any sampling period, and is given by: $\Delta$cc $O_2$ scavenged/($m^2$·Dday), where $\Delta$ is the incremental change. The number in parenthesis is the number of days after triggering required to reach the peak rate.

TABLE 1

Low Intensity Germicidal UV (254 nm) Triggering
LLDPE/OSL/LLDPE films at room temperature

| Dose (J/cm$^2$) | Irradiation Time (seconds) | Induction Period (days) | Average Rate (ccO$_2$/m$^2$/day) | Peak Ins. Rate (cc O$_2$/m$^2$/day) |
|---|---|---|---|---|
| 0.26–0.36 | 63 | >1 <2 | 50 | 134 (3) |
| 0.63–0.86 | 50 | <1 | 40 | 134 (3) |
| 1.3–1.8 | 310 | <1 | 40 | 206 (2) |
| 2.7–3.6 | 630 | <1 | 44 | 190 (2) |

The data in Table 1 shows that low intensity short wavelength UV is quite effective in triggering oxygen scavenging. In addition, higher doses have little effect on the average scavenging rate but do seem to increase the peak instantaneous rate.

EXAMPLE 2

This example illustrates the advantage of UV-C light at 254 nm over other wavelengths for use in triggering oxygen scavenging film. Samples of film were evaluated for a lidstock film, and a laminate for vertical/form/fill/seal pouches ("ONPACK" in Table 3). The lidstock film was a three layered film having the structure LLDPE/OSL/LLDPE (1/1/1 mil) The LLDPE layers were layers of Dowlex 3010 film from Dow Chemical. The OSL (oxygen scavenging layer) consisted of 50% styrene-isoprene-styrene triblock copolymer (Vector™ 4114-D from Dexco) 40% LDPE 1017 (Chevron) 10% SF (side feed) containing Quantum MU763-EVA 5% benzophenone and 3% cobalt neodecanoate (Ten-Cem® from OMG, Inc.) and 1% calcium oxide. The laminate was also a three layer structure LLDPE/OSL/LLDPE (1/1/1 mil), having an OSL layer of RB-830® from Japan Synthetic Rubber, and Vistalon™ 3708 (Exxon) (a final concentration of 540 ppm cobalt and 0.5% Benzophenone).

Triggering of the films was evaluated at two wavelengths and various dosages using four different types of lamps as the light source. It should be noted in these examples that dose is measured at or about the wavelength specified. Tables 2 to 4 set forth the parameters of each test.

TABLE 2

Parameters Used in the Triggering of lidstock and laminate Structures

| LAMP | WAVELENGTH (nm) | INTENSITY (mW/cm$^2$) | DOSAGE USED (J/cm$^2$) |
|---|---|---|---|
| AMERGRAPH ® from American Graphics | 365 | 3 | 0.5, 0.75, 1.0 |
| ANDERSON-VREELAND | 365 | 25 | 0.5, 0.75, 1.0 |
| CYREL | 365 | 32 | 0.5, 0.75, 1.0 |
| UVP\Blak-ray-XX-15s | 254 | 5.7 | 0.36, 0.71, 3.6 |
| ANDERSON-VREELAND | 254 | 9.2 | 0.39, 0.76, 3.8 |

TABLE 3

Triggering Experiments at 365 nm

| NO. | Film Type | Dose (Joules/cm$^2$) | Intensity (mW/cm$^2$) | Exposure Time (dependent variable) (seconds) |
|---|---|---|---|---|
| 1 | ONPACK | 0.5 | 25 | 20 |
| 2 | LIDSTOCK | 0.75 | 3 | 250 |
| 3 | ONPACK | 0.75 | 32 | 24 |
| 4 | LIDSTOCK | 0.5 | 3 | 166 |
| 5 | LAMINATE | 1.00 | 3 | 333 |
| 6 | LAMINATE | 0.75 | 25 | 30 |
| 7 | LAMINATE | 0.75 | 32 | 24 |
| 8 | LIDSTOCK | 0.50 | 32 | 16 |
| 9 | LAMINATE | 1.0 | 32 | 32 |
| 10 | LIDSTOCK | 1.0 | 3 | 333 |
| 11 | LIDSTOCK | 1.0 | 32 | 32 |
| 12 | LAMINATE | 1.0 | 25 | 40 |
| 13 | LIDSTOCK | 1.0 | 25 | 40 |
| 14 | LAMINATE | 0.50 | 3 | 166 |
| 15 | LAMINATE | 0.75 | 3 | 250 |
| 16 | LIDSTOCK | 0.50 | 25 | 20 |
| 17 | LAMINATE | 0.50 | 32 | 16 |
| 18 | LIDSTOCK | 0.75 | 25 | 30 |

TABLE 4

Triggering Experiments at 254 nm

| NO. | Film Type | Dose (Joules/cm$^2$) | Intensity (mW/cm$^2$) | Exposure Time (dependent variable) (seconds) |
|---|---|---|---|---|
| 1 | LAMINATE | 0.05 | 9.2 | 42 |
| 2 | LIDSTOCK | 0.50 | 5.7 | 625 |
| 3 | LIDSTOCK | 0.05 | 5.7 | 62.5 |
| 4 | LAMINATE | 0.50 | 9.2 | 420 |
| 5 | LIDSTOCK | 0.05 | 9.2 | 42 |
| 6 | LAMINATE | 0.10 | 9.2 | 84 |
| 7 | LIDSTOCK | 0.10 | 5.7 | 125 |
| 8 | LIDSTOCK | 0.50 | 9.2 | 420 |
| 9 | LAMINATE | 0.10 | 5.7 | 125 |
| 10 | LIDSTOCK | 0.10 | 9.2 | 84 |
| 11 | LAMINATE | 0.05 | 5.7 | 62.5 |
| 12 | LAMINATE | 0.50 | 5.7 | 625 |

Figure 3:
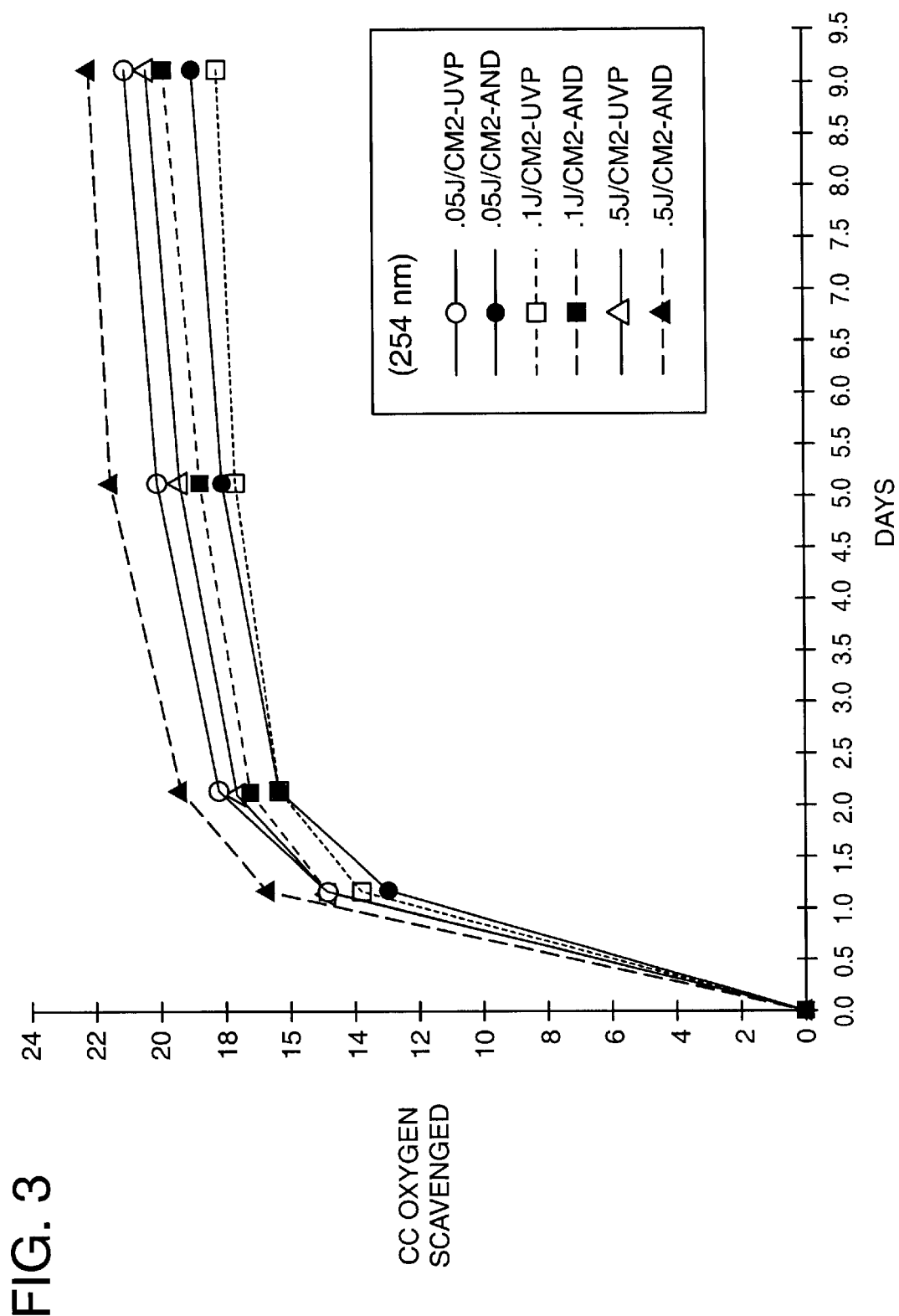
FIGS. 3 and 4 illustrate the amount of oxygen scavenged by various oxygen scavenging lidstock films triggered at 254 and 365 nm respectively.
Figure 4:
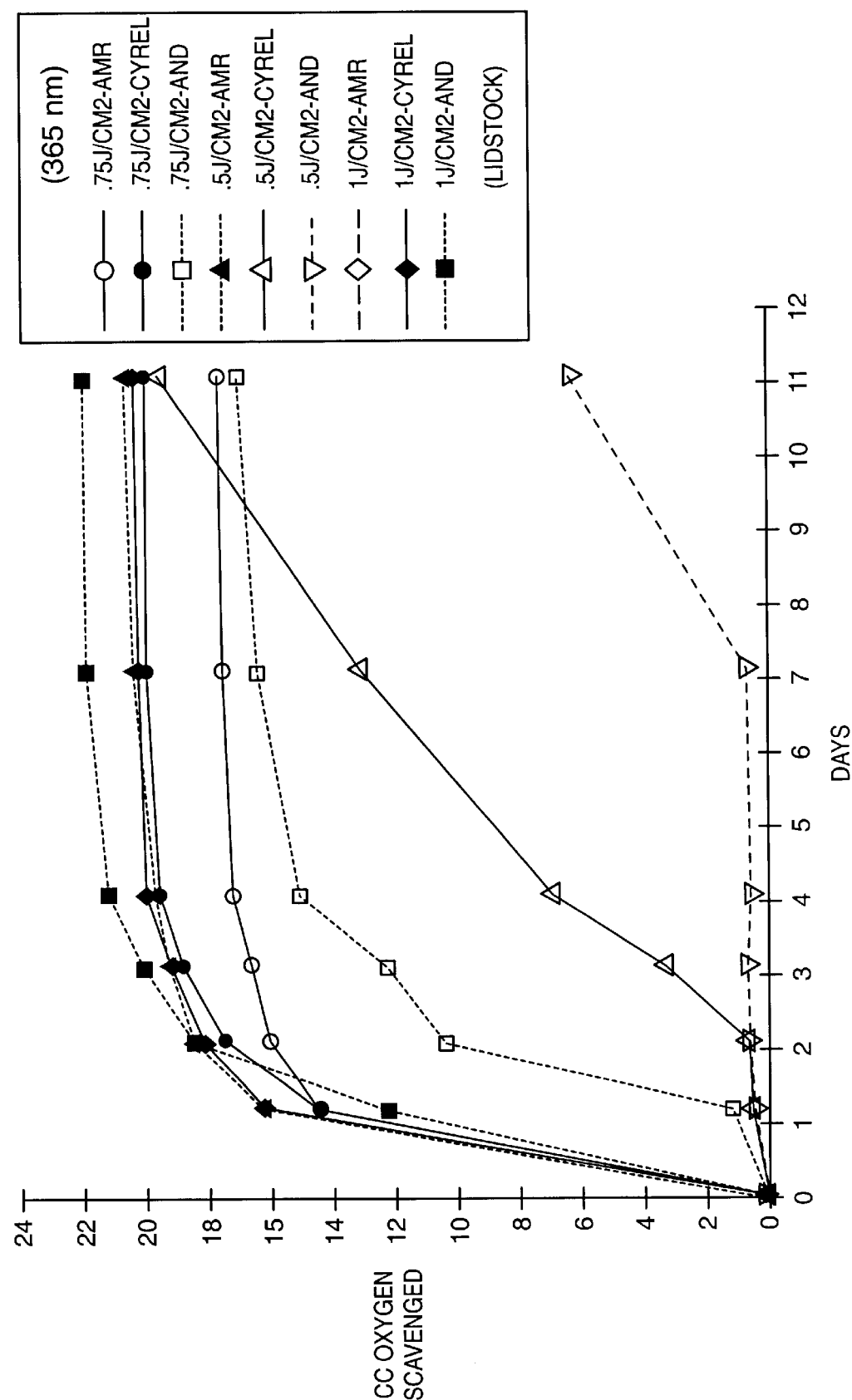
Figure 5:
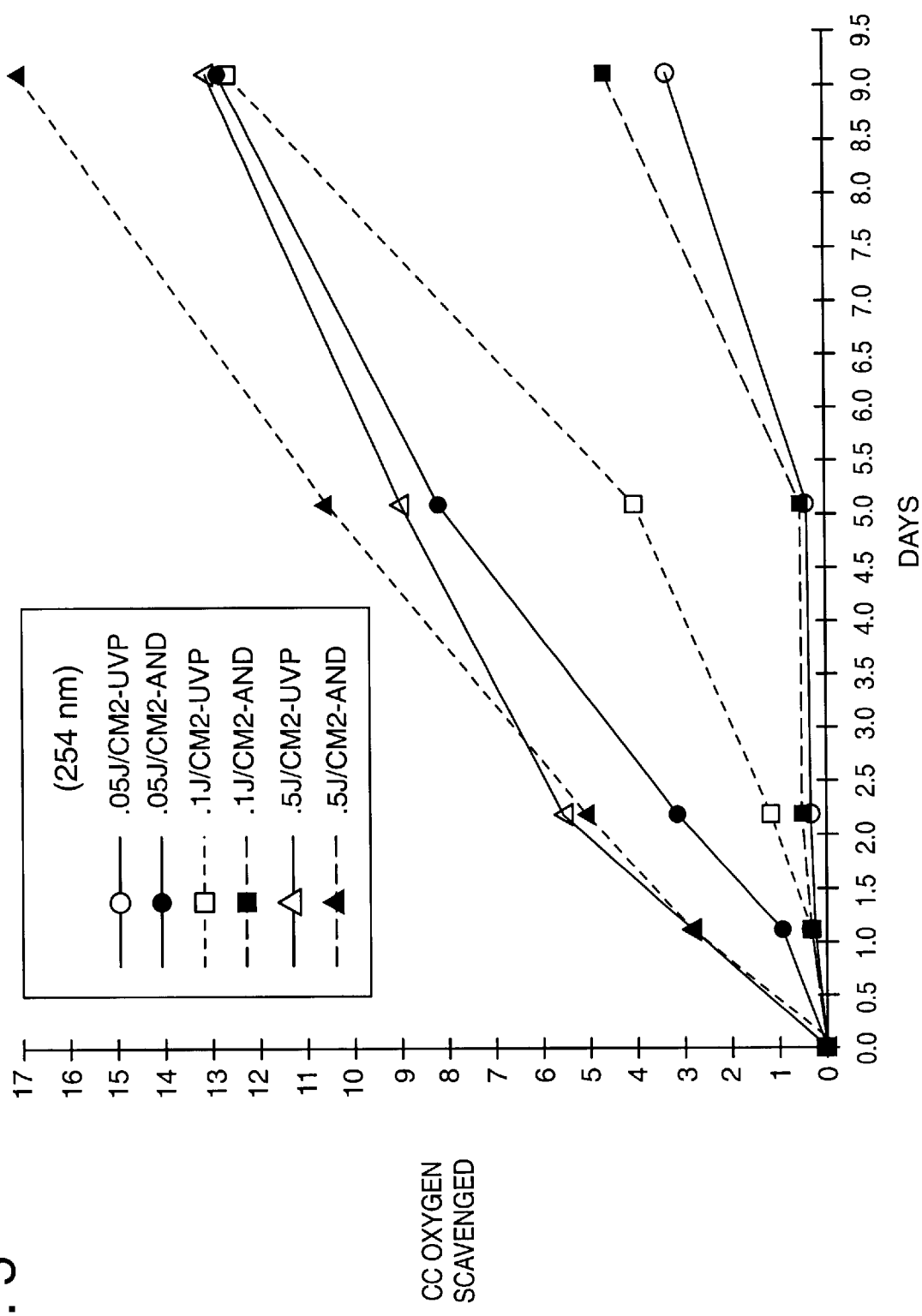
FIGS. 5 and 6 illustrate the oxygen scavenged by various oxygen scavenging laminates made into barrier packages which were triggered at 254 and 365 nm respectively.
Figure 6:
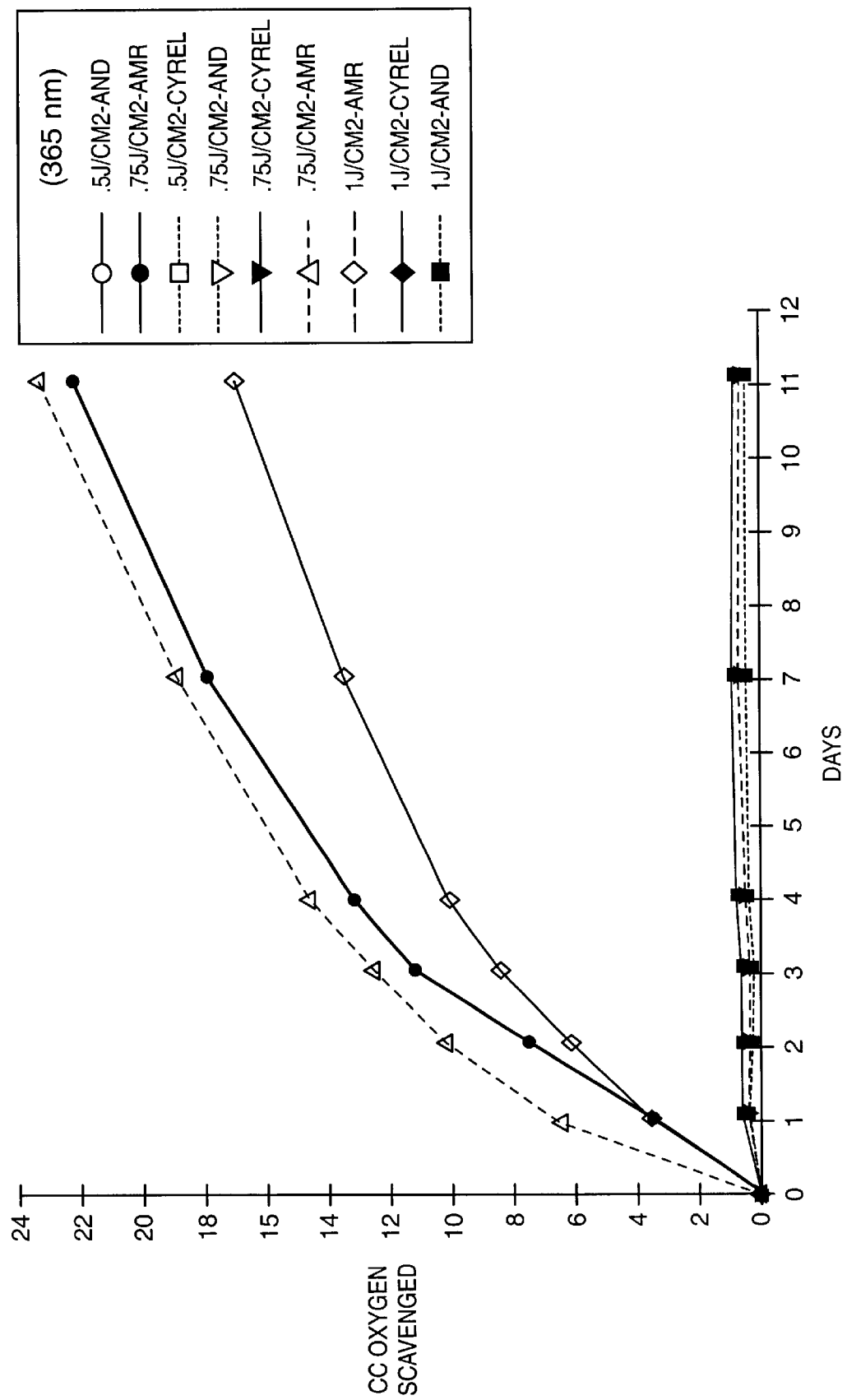

Each film was provided as a 200 cm$^2$ piece, which was triggered at the specified dose and tested in a barrier bag having 300 cc headspace of air at room temperature. The oxygen scavenging rates for each sample were determined and are set forth in FIGS. 3–6. As shown, the exposure times ranged from as short as 16 seconds to as long as 625 seconds. As shown in FIG. 3, the lidstock film was successfully triggered using low intensity light at 254 nm. Lidstock films triggered with dosages of 0.4 J/cm$^2$ had scavenging rates similar to films triggered at 3.6–3.8 j/cm$^2$. Triggering with 365 nm resulted in longer induction periods and lower oxygen scavenging rates (see FIG. 4) thereby clearly indicating the superiority of low intensity light at 254 nm for triggering. For the laminate film, 254 nm light also provided better results as shown by FIGS. 5 and 6.

EXAMPLE 3

Figure 7:
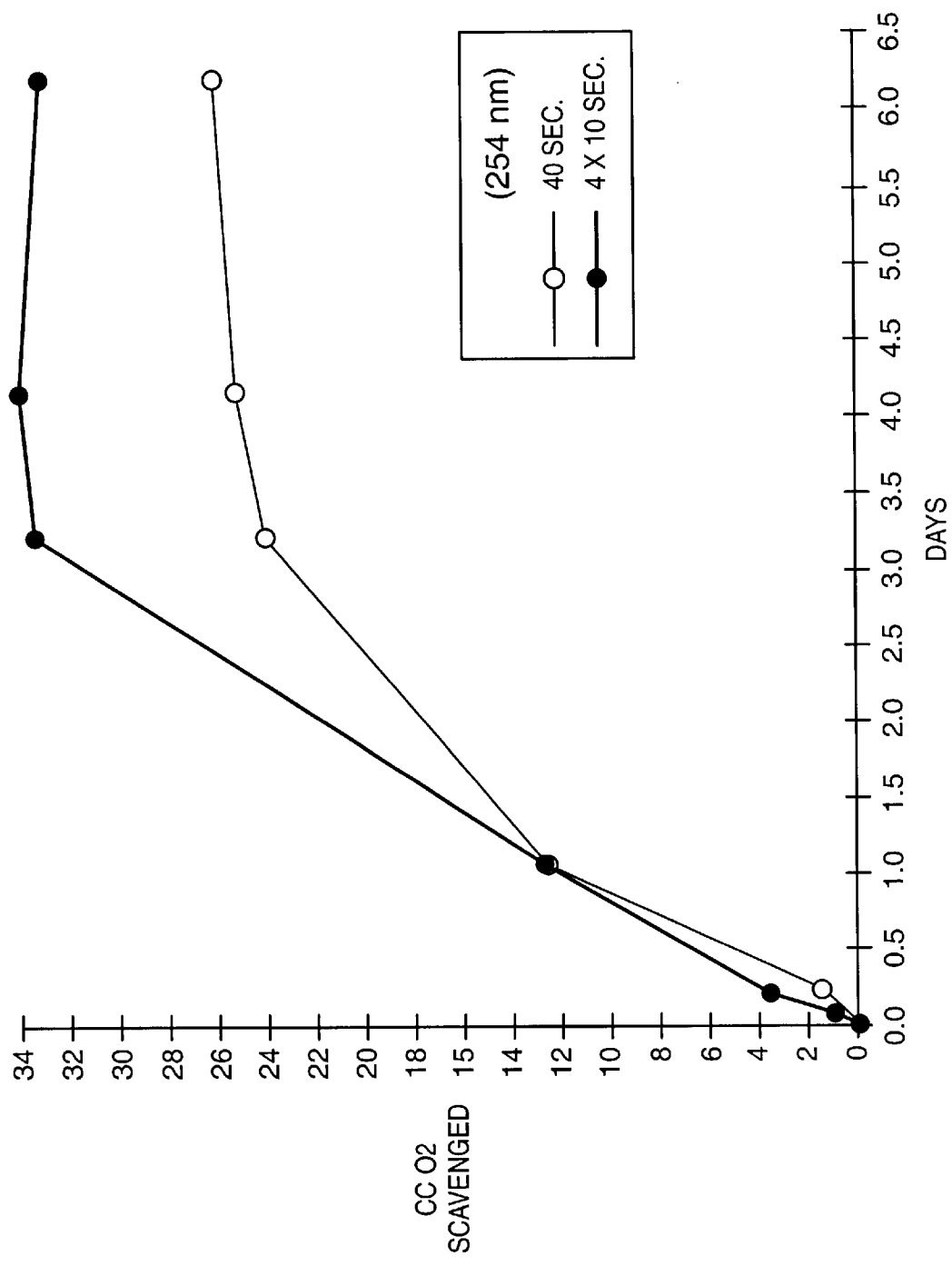
FIG. 7 illustrates a comparison of oxygen scavenging for films triggered a single exposure of 40 seconds to a film triggered in 4 sequential 10 second periods.

In this example, lidstock film as in Example 2 was exposed to light at 254 nm (1) for 40 seconds and (2) for four periods of 10 seconds, each separated by 2 second breaks. FIG. 7 illustrates the oxygen scavenging rates exhibited by the films, demonstrating that the stepwise triggering resulted in at least equivalent or better oxygen scavenging than the single triggering step.

EXAMPLE 4

This example further illustrates the effective triggering of oxygen scavenging films according to the present invention. Samples of a lidstock film were triggered using the apparatus in FIG. 1 employing 254 nm light at several dose rates and web speeds, and the triggered samples were tested for oxygen scavenging rates and induction period. Film samples with the following structure: Saran coated PET//EVA/OSL/LLDPE (0.48//1.2/0.5/0.3 mil) were provided. The EVA layer was an ethylene/vinyl acetate copolymer layer (Rexene PE1375). The OSL layer was 50% SBS (Vector®8508 from Dexco), 40% LDPE (Chevron PE1017), 8.54% EVA (Quantum), 0.90% cobalt neodecanoate (Ten-Cem® from OMG. Inc.), 0.5% benzophenone, 0.050% CaO and 0.01% stabilizer (lrganox®) 1076 from Ciba-Geigy). The LLDPE layer was Dowlex 2244A. The film was refrigerated to 4° C. and triggered, and then exposed to a 300 cc headspace containing 99% N$_2$ and 1% O$_2$ and further stored at 4° C. The scavenging rates for each sample are set forth below in Table 5.

TABLE 5

SCAVENGING PERFORMANCE OF LAMINATED FILM TRIGGERED ON APPARATUS OF FIG. 1 [200 CM$^2$ FILM SAMPLE]

| DOSE (mJ/cm$^2$) | WEB SPEED (FPM) | AVERAGE RATE(a) (CC/(M$^2$DAY)) | | INDUC- TION PERIOD | PEAK INST. RATE (CC/(M$^2$DAY)) MEAN | (b) |
|---|---|---|---|---|---|---|
| | | Mean | St. Dev. | | | |
| 661 | 8 | 28.7 | 0.8 | <1 | 87.1 | 1 |
| 559 | 12(c) | 41.0 | 6.2 | <1 | 58.1 | 1 |
| 483 | 16 | 26.6 | 0.8 | <1 | 68.6 | 1 |

(a)average rate calculated after 4 days.
(b)days to reach peak rate.
(c)packages run on Multivac ® R7000.

As shown, each sample had an induction period of less than one day, and exhibited excellent average and peak instantaneous oxygen scavenging rates.

EXAMPLE 5

Figure 8:
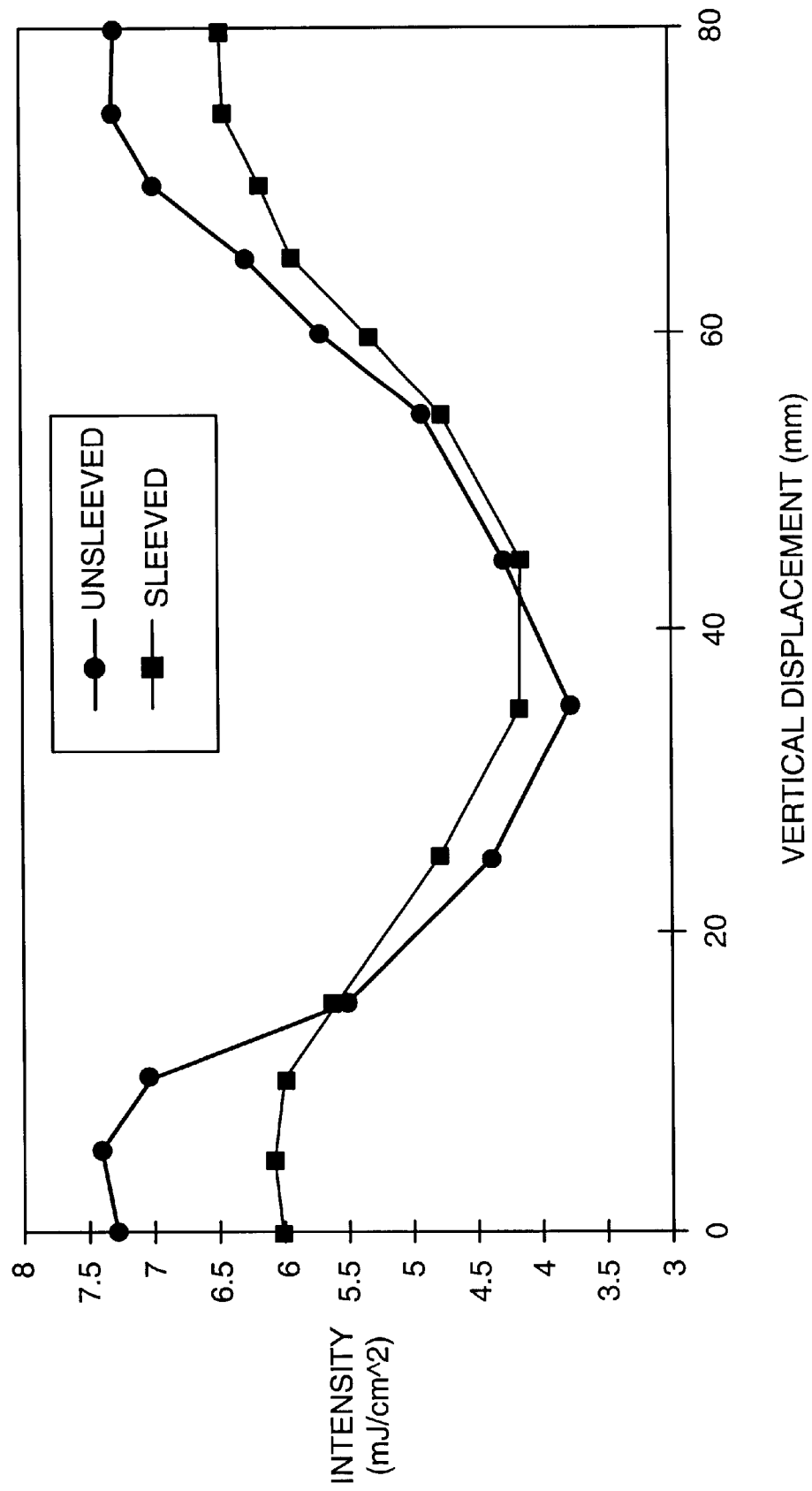
FIG. 8 illustrates a relationship between lamp intensity and vertical displacement from the bulb for sleeved and unsleeved bulbs.

This example demonstrates the effectiveness of bulbs having a sleeve member in triggering oxygen scavenging film. The UV intensity of sleeved and unsleeved bulbs were determined using a radiometer described in Example 1 The intensity between two bulbs, at a distance of 2.54 cm from the plane of the bulbs and vertical displacement along the path from one bulb to the other was determined and is illustrated in FIG. 8. As shown, the intensity of sleeved bulbs is not significantly impacted.

Figure 11:
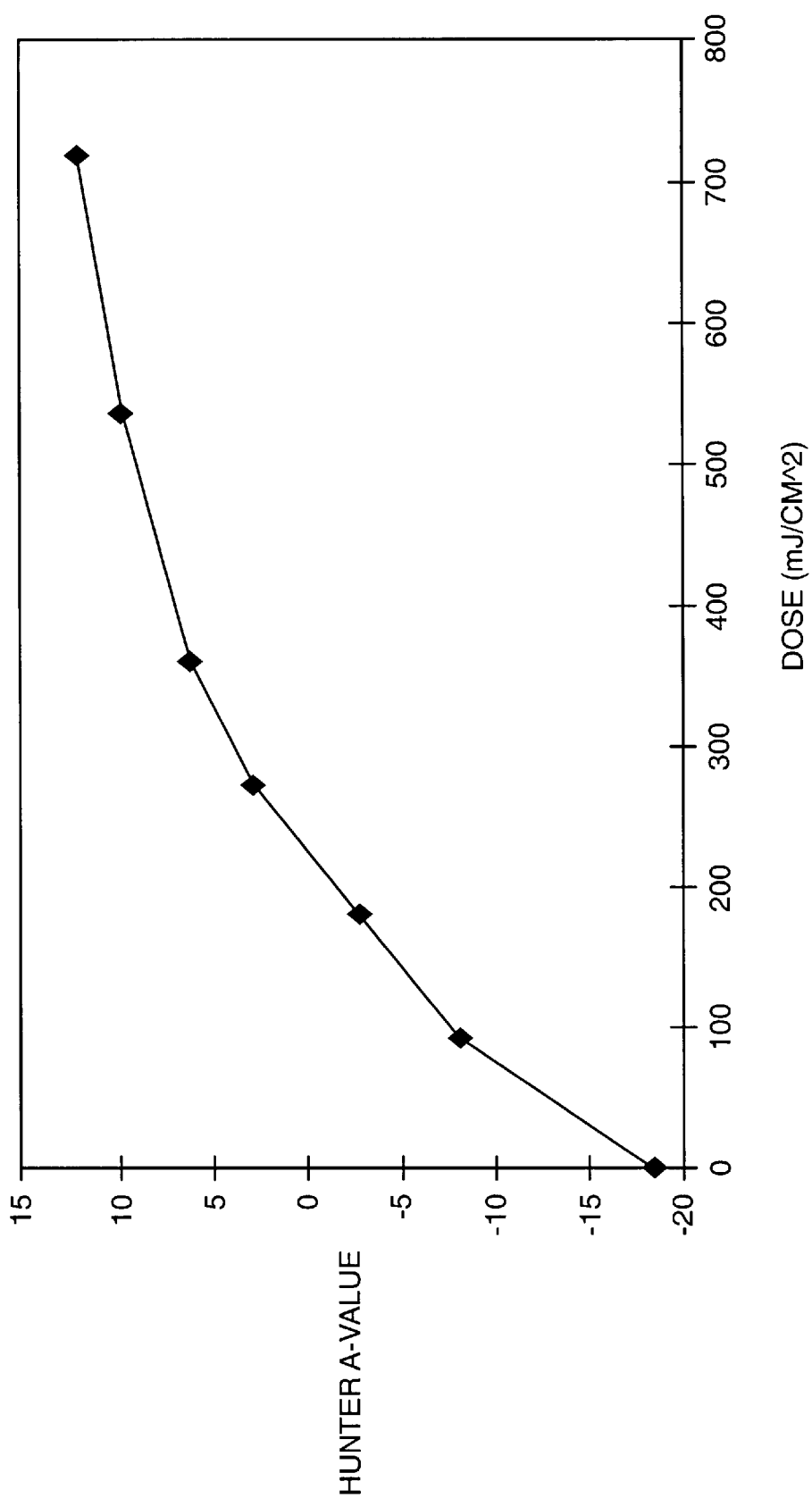
FIG. 11 illustrates the calibration curve of dose vs. Hunter a-value.

A film having the same composition as described in Example 4 was triggered using the sleeved and unsleeved bulbs as set forth above. Dose rate calibration was accomplished using radiochromic Control Cure® labels (UV Process Supply/Chicago, Ill.) These labels were exposed at varying dose rates using the Blak Ran XX-15S. Dose Rate was measured with the IL.1400A/SEL240. The dose received is proportional to the degree of color change of the label (green to red). The Hunter a-value of the labels was measured with the Minolta CR-001 (D-65 illuminant). A calibration curve is illustrated in FIG. 11. In FIG. 11, the horizontal axis (abscissa) represents dose, measured in mJ/cm$^2$, and the vertical axis (ordinate) represents the Hunter a-value. The average dose received by each sample was determined and is set forth below in Table 6.

TABLE 6

DOSIMETERY OF SLEEVED AND UNSLEEVED UV BULBS. LINE SPEED 12 FPM.

| TREATMENT | AVERAGE HUNTER A-VALUE | AVERAGE DOSE (mJ/cm2) |
|---|---|---|
| UNSLEEVED 12 FPM | 7.37 | 475.5 |
| SLEEVED 12 FPM | 6.68 | 447.4 |
| DOSE REDUCTION | | 5.91% |

As shown, the dose was reduced by only 6% with the sleeved bulbs.

Standard refrigerated MAP headspace scavenging tests were performed on the film triggered as described above. Triggered specimens were affixed to the inside of a P640B pouch (available from Cryovac® Division of W.R. Grace & Co.), vacuum sealed, and inflated with 300 cc modified atmosphere (1% O$_2$, 99% N$_2$) and stored at 4° C. Samples were withdrawn and tested for oxygen content as described above in Example 1. The results are set forth below in Table 7.

TABLE 7

SCAVENGING PERFORMANCE OF LAMINATED FILM TRIGGERED WITH FEP-TEFLON SLEEVED BULBS. 100 CM² FILM SAMPLE

| TREATMENT | AVERAGE RATE(a) (CC/M²/DAY) | | INDUC-TION PERIOD | PEAK INST. RATE (CC/M²/DAY) | |
|---|---|---|---|---|---|
| | MEAN | ST. DEV. | | MEAN | (b) |
| SLEEVED | 34.8 | 0.1 | <1 | 73.3 | 1 |
| UNSLEEVED | 34.1 | 2.7 | <1 | 64.8 | 1 |

(a) average rate calculated after 6 days.
(b) days to reach peak rate.

As shown film triggered with sleeved bulbs exhibited substantially unchanged oxygen scavenging capability as compared to the film triggered with unsleeved bulbs.

EXAMPLE 6

This example illustrates the advantages obtained using a triggered oxygen scavenging film as compared to packages prepared without a triggered oxygen scavenging film.

Figure 9:
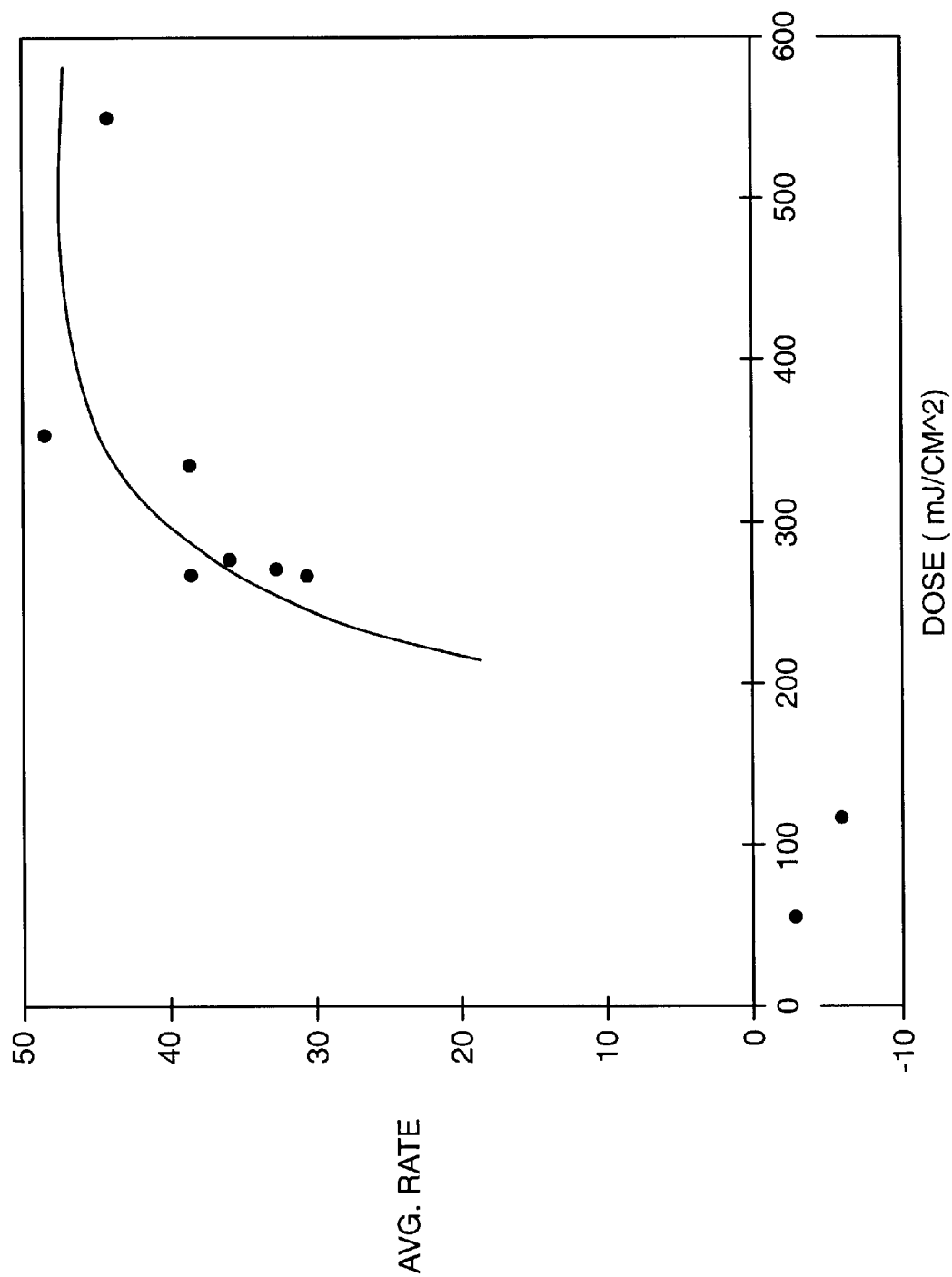
FIG. 9 illustrates the relationship between average oxygen scavenging rate and dose applied to the film at 254 nm.

As shown in FIG. 9 doses of UV-C light at 254 nm of greater than 200–250 mJ/cm² provided excellent average oxygen scavenging rates.

EXAMPLE 7

This example demonstrates the scavenging rate of film triggered in accordance with the present invention. The film of Example 4 was selected for this example. The article tested was sliced bologna obtained from Greenwood Packing/Greenwood S.C. Bologna was selected because its color is extremely sensitive to $O_2$ and light exposure. Also, the color of this article tends to be very uniform, which helps reduce variability in color measurements. The film was triggered on the module in FIG. 1 at 12 FPM(559 mJ/cm²), and slit to 405 mm width. Packages were produced on the Multivac R7000 (pocket size 110 mm×10 mm×40 mm). Packages were gas flushed with $N_2$ to approximately 0.1% residual $O_2$. In order to simulate a worst-case gas-flush scenario, the residue $O_2$ was then raised to 0.7% to 1.0% by injecting 2 cc of 90% $O_2$: 10% $N_2$ into the package. Packages were then stored in the dark at 4.4° C. (40° F.) for various lengths of time, from 0 to 19 days. Samples of each treatment were run in duplicate. Packages were placed under the display lights at 4.4° C. (40° F.) for 5 days prior to sampling. Oxygen concentration was measured on each package at three times:
 1. After packaging,
 2. When package was placed into lighted display,
 3. After 5 days lighted display.

Figure 10:
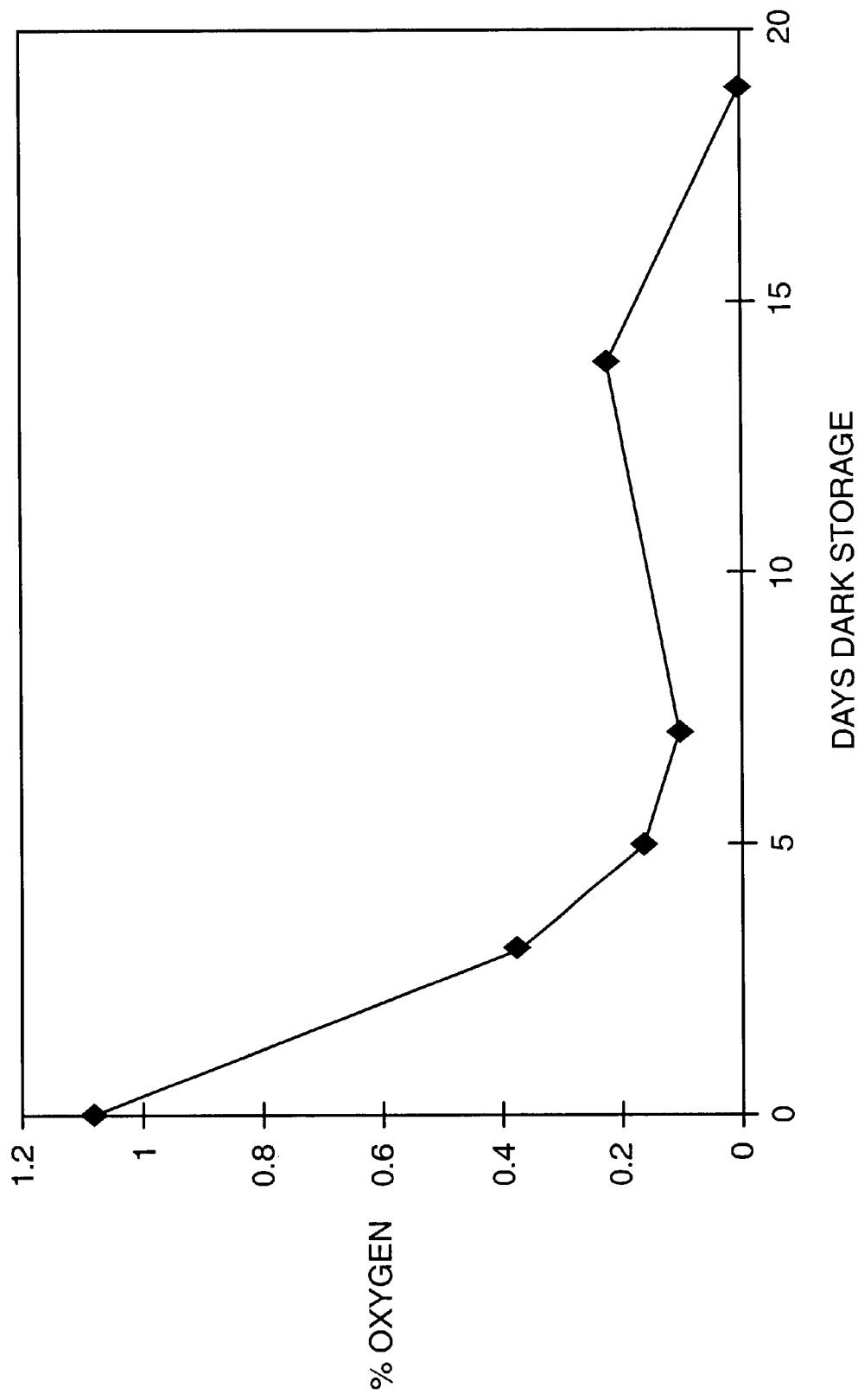
FIG. 10 illustrates the average $O_2$ residuals of packages being placed into lighted display.
Figure 12:
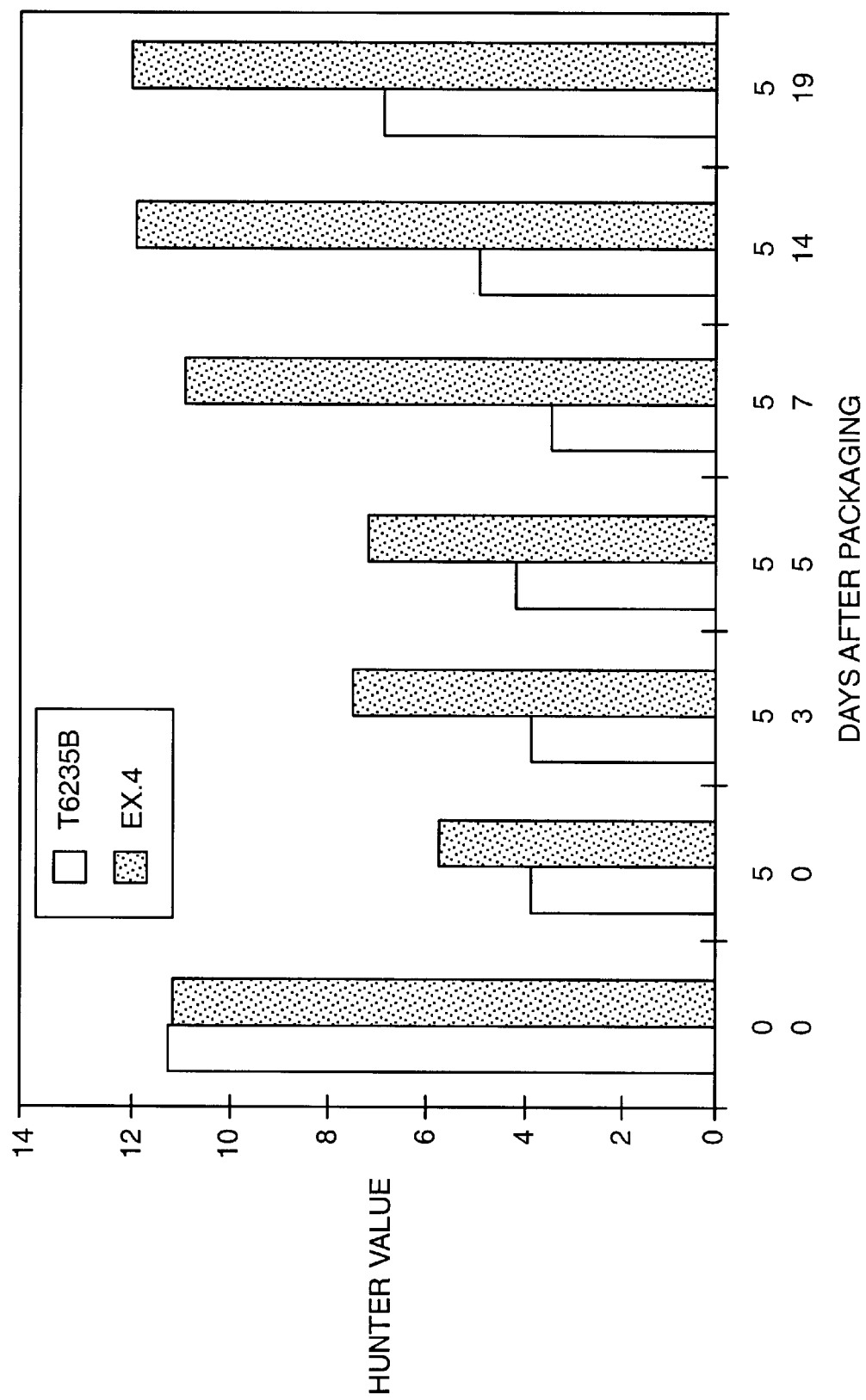
FIG. 12 illustrates the relative improvement in color (higher Hunter a-value) of bologna slices packaged in the oxygen scavenging film of Example 4, as opposed to bologna packaged in T6235.

Color was measured using the Minolta CR-100 (C illuminant) on the Hunterlab L*a*b scale. Color measurements were taken through 1 layer of 75 ga. BDF-2001 at 4 points around the perimeter, and once in the center of the bologna slice. FIG. 12 illustrates the relative improvement in color (higher Hunter a-value) of bologna slices packaged in the oxygen scavenging film of Example 4, as opposed to bologna packaged in T6235. In FIG. 13, the horizontal axis (abscissa) represents days after packaging. The lower line represents days in dark storage, and the upper line represents days in lighted display. Thus, for example, for the last pair of bars appearing in the extreme right part of the graph, each sample was exposed to 19 days in dark storage, followed by 5 days in lighted display. The vertical axis (ordinate) of FIG. 12 represents the Hunter a-value. FIG. 10 illustrates the average $O_2$ residuals of packages being placed into lighted display. It can be seen that the film scavenged well, reducing the $O_2$ residual from 1% to less than 0.2% within 5 days.

The invention is not limited to the illustrations described herein, which are deemed to be merely illustrative, and susceptible of modification of form, size, arrangement of parts and details of operation.

What is claimed is:
1. A method comprising:
 a) providing an unwind roll, said roll adapted to hold a roll of oxygen scavenging film, the film comprising an oxidizable organic compound and a transition metal catalyst;
 b) providing an apparatus for triggering said film, the apparatus comprising a series of bulbs adapted to emit UV-C light having a wavelength of between 200 and 280 nanometers, the bulbs arranged in banks so as to expose the oxygen scavenging film to a dose of said UV-C light of at least 100 mJ/cm² as the film passes the bulbs;
 c) advancing the film from the unwind roll to the apparatus for triggering the film by means of a series of rollers that define a film path extending from the unwind roll to the apparatus for triggering the film;
 d) passing the film past the series of UV bulbs arranged in banks;
 e) exposing the film to UV-C light having a wavelength of between 200 and 280 nanometers, so as to provide a triggered film;
 f) advancing the triggered film from the apparatus for triggering to an apparatus for packaging articles; and
 g) applying said triggered film, in the apparatus for packaging articles, to make packages for containing said articles;
 whereby said triggered film is continuously triggered and incorporated into said packages so as to provide oxygen scavenging packages.

2. The method of claim 1 comprising advancing the film from the unwind roll to the apparatus for triggering the film by means of a series of rollers that define a film path extending from the unwind roll to the apparatus for triggering the film, wherein the series of rollers define a film path at a distance from the banks of UV-C bulbs of between 1 and 3 centimeters.

3. The method of claim 1 comprising providing a sensor unit for monitoring the dose of UV-C light emitted by the bulbs.

4. The method of claim 1 comprising shielding the bulbs so as to correspond to an effective irradiance E of less than or equal to 0.1 mW/cm².

5. The method of claim 1 comprising providing an apparatus for triggering said film, the apparatus comprising a series of fluorescent tube-type bulbs.

6. The method of claim 1 comprising exposing the film to UV-C light in a plurality of discrete periods of time.

7. The method of claim 1 comprising exposing the film to UV-C light for between 15 and 90 seconds.

8. The method of claim 1 comprising exposing the film to UV-C light over a path of between 1 meter and 12 meters.

9. The method of claim 1 comprising providing the bulbs with a sleeve member.

10. The method of claim 9 comprising providing the bulbs with a shrinkable sleeve member that is applied to the bulbs.

11. The method of claim 9 comprising providing the bulbs with a coating that is applied to the bulbs.

* * * * *